J. E. FUNK.
TOWING CONNECTION FOR AUTOMOBILES.
APPLICATION FILED NOV. 27, 1916.
1,220,214.
Patented Mar. 27, 1917.
2 SHEETS—SHEET 2.
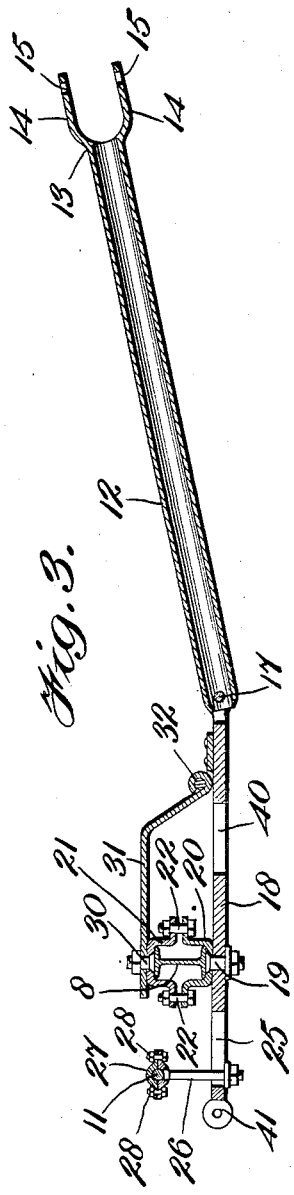
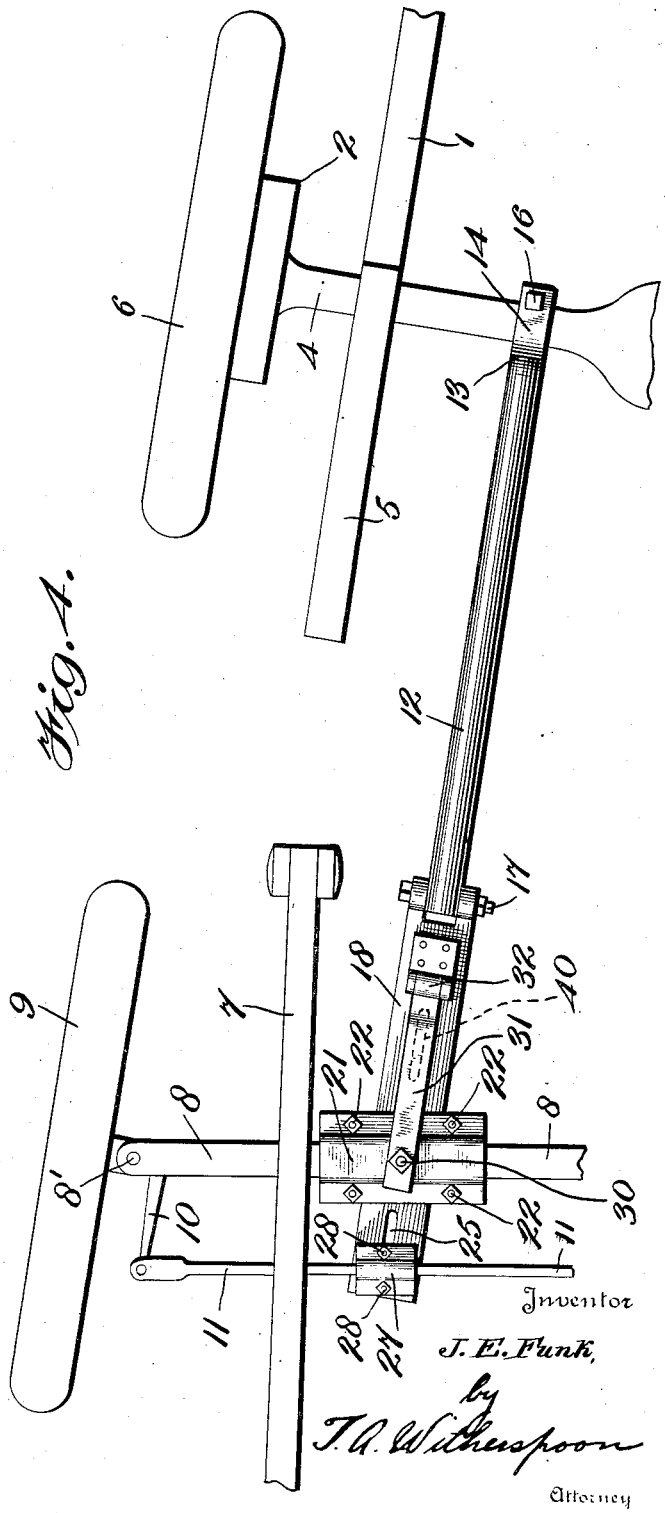
Witness
Harold Strauss
Inventor
J. E. Funk,
by
T. A. Witherspoon
Attorney

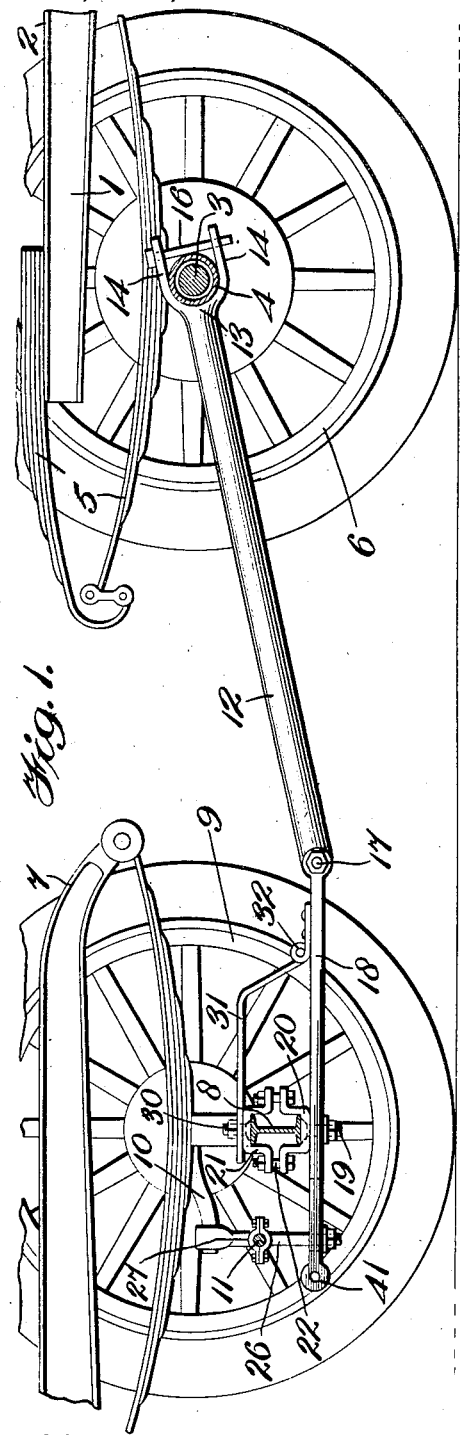

UNITED STATES PATENT OFFICE.

JAMES E. FUNK, OF DICKINSON, NORTH DAKOTA.

TOWING CONNECTION FOR AUTOMOBILES.

1,220,214.  Specification of Letters Patent.  Patented Mar. 27, 1917.

Application filed November 27, 1916. Serial No. 133,693.

*To all whom it may concern:*

Be it known that I, JAMES E. FUNK, a citizen of the United States, residing at Dickinson, in the county of Stark and State of North Dakota, have invented certain new and useful Improvements in Towing Connections for Automobiles; and I do hereby declare the following to be a full, clear, and exact description of the invention, such as will enable others skilled in the art to which it appertains to make and use the same.

This invention relates to towing connections for vehicles, especially of the automobile type, and has for its objects to provide a device of this character which will be simple in construction, comparatively inexpensive to manufacture, and more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a diagrammatic side elevational view partly in section of one form of device made in accordance with this invention, showing it applied to two automobiles;

Fig. 2 is a plan view of the parts shown in Fig. 1;

Fig. 3 is a central longitudinal sectional view of the device detached from the vehicles; and Fig. 4 is a view similar to Fig. 2 illustrating the operation of the apparatus when the vehicles are turning a corner.

1 designates the frame of a motor vehicle 2 having a rear axle 3 mounted within a housing 4 and provided with the spring 5 and rear wheel 6. 7 indicates a similar vehicle provided with a front axle 8, having the pivots 8' to one of which is pivoted, in the usual manner, the front wheel 9 adapted to be turned upon its said pivot 8' by the lever 10, and connecting rod 11, all as will be clear from the drawings.

12 represents a tube or rod, one end of which is bifurcated as at 13 to form a pair of fingers 14, each of which is provided with an opening 15 adapted to receive a pin or other fastening means 16, as will be more fully disclosed below. Pivoted to the other end of the tube 12 as at 17, is a bar 18 to which is pivotally secured, as at 19, a clamping means comprising a pair of U-shaped clamping members 20 and 21, adapted to be secured together by suitable bolts or other fastening members 22.

The said clamping members 20 and 21 are adapted to fit the front axle 8 as shown, and to securely connect the towing bar 18 thereto through the pivot 19. The said bar 18 is provided at its rear end with a slot 25 in which fits the pivotal connection 26 of the clamp 27 composed of two members, as shown, and which members are adapted to straddle or to be clamped to the said connecting rod 11. The said clamp 27 is secured to said rod 11 as by means of the bolts or other fastenings 28 as shown.

Located above the bar 18 and secured to the clamping member 21 as by means of the pivotal connection 30, is the member 31 preferably bent into the form shown and which member is hingedly connected as at 32 to the said bar 18.

It will now be clear from what has just been disclosed that if the rear axle housing 4 of the towing automobile is rigidly secured to the towing connection or tube 12 by the means illustrated, that when the said towing machine changes its direction or course, the towing connection or tube 12 and the bar 18 will remain in a straight line substantially perpendicular to the rear axle housing 4, and that as the said members 12 and 18 swing on the pivots 19 and 30 the slot 25 in the bar 18 will cause the connection 26 to move the clamp 27 and the connecting rod 11 in a direction parallel to the front axle 8 of the towed machine. This movement of the connecting rod 11 will be in such a direction as to turn, through the lever 10, the front wheels 9 of the towed machine in the direction necessary to cause the said towed machine 7 to follow the tracks of the towing machine 2.

The towing members 12, 18 and 27 will cause in all cases the connecting rod 11 to be moved in such a direction as to compel the towed machine 7 to follow the changing courses of the towing machine 2 just as effectively and as accurately as would be the case if a chauffeur or other person were located in the towed machine 7, and were actuating the said rod 11 by means of a steering wheel not shown. In order to facilitate the operation of the parts just described the said pivots 19 and 30 are located in the same vertical line as illustrated in Fig. 3. It will be further observed that the pivot 17 enables the connection between the towed and towing machine to give when uneven ground is encountered so that undue strain is not brought on the connections at the axles 3 and 8. The hinged connection 32 of the member 31 facilitates the ready attachment and detachment of the clamping member 21 to the rear axle housing 4.

The bar 18 is provided with an extra slot 40 spaced a different distance from the pivot 19 than the slot 25, so as to accommodate connecting rods 11 which are spaced different distances from the front axle 8. In other words, by simply removing the pivot 17 and rotating the bar 18 on the pivot 19 so as to bring the slot 40 under the connecting rod 11 one may connect the clamp 27 with the connecting rod 11 which is spaced farther from the front axle 8 than is the case illustrated in Fig. 3.

In such a case the pivot pin 17 is passed through the hole 41 shown in the rear end of the bar 18, as illustrated in Fig. 3.

The operation of the towing connection or pole will be clear from the foregoing, but may be briefly summarized as follows:—A towing automobile such as 2 is brought in front of a disabled machine such as 7, the front axle 8 of the disabled machine and the rear axle 3 of the towing machine are joined as disclosed above, whereupon the chauffeur in the towing machine 2 can bring in the disabled car without the aid of another man in the disabled car 7 as is now necessary, for the towing connection will cause the disabled car 7 to follow accurately the tracks of the towing car 2. In fact, the towed and towing machines are fastened together almost rigidly and all jerking and danger of breaking the towing connection, when encountering rough roads, is thus obviated.

In addition to the above, this towing connection does away with a very dirty and disagreeable job which the man in the disabled car encounters while steering the said disabled car. The man in the towing or front car 2 has the rear car always under his control and even when he applies the brakes the connections 12 and 18 being substantially rigid, the application of said brakes to the front car 2 is immediately felt on the rear car 7. It therefore follows that it is comparatively easy for the front car to pull with safety the rear car over bad places in the road and around other vehicles that may be encountered. In fact, the front car can cause the rear car to start and stop with the same certainty as it starts and stops itself.

The towing connections 12 and 18 can be set or secured to one side of the center or may be even secured diagonally of the axles according to the specific makes of the different cars.

An additional advantage of this invention resides in the fact that it is a time saver in that it takes only a short time to attach and detach it, and further, the towed car can be brought in at a higher rate of speed over rough roads than it is safe to do with the ordinary flexible rope connections now employed.

It is obvious that those skilled in the art may vary the details of the construction as well as the arrangement of parts without departing from the spirit of the invention and therefore, I do not wish to be limited to the above disclosure except as may be required by the claims.

What I claim is:—

1. In a towing connection for automobile cars the combination of a rigid member having one end bifurcated to form a clamp adapted to be secured to the rear axle of a towing car, and having its other end provided with a pivot pin adapted to normally lie in a horizontal plane; a second rigid member pivoted at one end to said pin, provided with a slot at its other end and provided between its ends with a vertically disposed pivot pin; a pair of clamping members adapted to embrace the front axle of the car being towed, one of which members is secured to said last named pivot pin, and the other of which members is provided with a second vertically disposed pivot pin; means connecting said second rigid member and said second vertically disposed pivot pin; and means associated with said slot for connecting said second rigid member with the steering rod of the car being towed, substantially as described.

2. In a towing connection for automobile cars the combination of a rigid member having one end bifurcated to form a clamp adapted to be secured to the rear axle of a towing car and having its other end provided with a pivot pin adapted to normally lie in a horizontal plane; a second rigid member pivoted at one end to said pin, provided with a slot at its other end and provided between its ends with a vertically disposed pivot pin; a pair of clamping members adapted to embrace the front axle of the car being towed, one of which members is secured to said last named pivot pin and the other of which members is provided with a second vertically disposed pivot pin; hinge means connecting said second rigid member and said second vertically disposed pivot pin to facilitate the application of said clamping members to said front axle; and means comprising a clamp and a pivoted connection associated with said slot for connecting said second rigid member with the steering rod of the car being towed, substantially as described.

3. In a towing connection for automobile cars the combination of a rigid member having one end bifurcated to form a clamp adapted to be secured to the rear axle of a towing car and having its other end provided with a pivot pin adapted to normally lie in a horizontal plane; a second rigid member pivoted at one end to said pin, provided with a slot at its other end, provided between its ends with a vertically disposed pivot pin and provided between its first named end and said pivot pin with an extra slot, said extra slot being spaced a different distance from said pivot pin than said first named slot to facilitate steering cars of different makes; a pair of clamping members adapted to embrace the front axle of the car being towed one of which members is secured to said last named pivot pin, and the other of which members is provided with a second vertically disposed pivot pin; means connecting said second rigid member and said second vertically disposed pivot pin; and means adapted to be associated with either of said slots for connecting said second rigid member with the steering rod of the car being towed, substantially as described.

In testimony whereof I affix my signature, in presence of two witnesses.

JAMES E. FUNK.

Witnesses:
J. P. CAIN,
E. M. SMITH.